United States Patent [19]
Olschewski et al.

[11] 4,339,374
[45] Jul. 13, 1982

[54] NOVEL MOLDING COMPOSITION PROVIDING SHAPED ARTICLES OF IMPROVED STRENGTH AND HEAT AND AGE RESISTANCE

[75] Inventors: Armin Olschewski, Schweinfurt; Manfred Brandenstein, Eussenheim; Heinrich Kunkel, Schweinfurt, all of Fed. Rep. of Germany

[73] Assignee: SKF Kugellagerfabriken GmbH, Fed. Rep. of Germany

[21] Appl. No.: 211,398

[22] Filed: Nov. 28, 1980

[51] Int. Cl.³ .............................................. C08L 77/00
[52] U.S. Cl. .................................... 524/606; 308/217; 524/555; 524/494; 524/496
[58] Field of Search .......................... 260/37 N, 42.18; 308/217, 218

[56] References Cited

U.S. PATENT DOCUMENTS

| | | | |
|---|---|---|---|
| 2,819,129 | 1/1958 | Slick | 308/217 |
| 3,141,711 | 7/1964 | Biedinger | 308/217 |
| 4,009,043 | 2/1977 | Preis | 260/37 N |
| 4,169,816 | 10/1979 | Tsien | 260/42.18 |

Primary Examiner—Lewis T. Jacobs
Attorney, Agent, or Firm—Eugene E. Renz, Jr.

[57] ABSTRACT

Novel molding compositions are described which are capable of being molded to form structural shapes, such as roller bearing cages, for example, and which comprise from about 40 to about 60% thermoplastic resin, preferably a polyamide, as a matrix, and uniformly dispersed therein, from about 5 to 15% and preferably about 5 to 10% carbon fiber, and about 15 to 25%, preferably about 15 to 20% glass fiber; the molded and set compositions having improved heat resistance, coefficient of heat expansion, bending strength, tensile strength, wear factor, coefficient of friction, heat conductivity, ease of processability and elastic deformability, as compared to similar compositions of the prior art.

5 Claims, No Drawings

NOVEL MOLDING COMPOSITION PROVIDING SHAPED ARTICLES OF IMPROVED STRENGTH AND HEAT AND AGE RESISTANCE

The present invention relates to novel molding compositions comprising a thermoplastic matrix containing carbon and glass fiber fillers in proportions which provide molded articles having improved properties of impact strength or toughness, elastic deformability, and aging resistance, in particular, as compared to articles made from similar compositions of the prior art and which are, therefore, suitable for making shaped articles, such as roller bearing cages, capable of withstanding stringent operating conditions.

BACKGROUND AND PRIOR ART

It has long been known that the properties of thermoplastic resins can be improved in certain respects by incorporating certain fibrous materials into the resins. For example, it has been suggested that the thermal behavior and sliding friction of such thermoplastics may be modified and improved by incorporation of a single type of fiber.

It has also been suggested in German Preliminary Patent Publication 2,016,746, published on Oct. 22, 1970 that various fibers of carbon or glass can be added to a thermoplastic resin, but without suggesting that any critical proportions of the materials are required to achieve an improvement in such properties as bending strength, tensile strength, heat resistance or elastic deformability.

Another material intended for use in friction bearings is described in German Preliminary Patent Publication 2,433,401 published on Jan. 30, 1975. This reference suggests various possible additives, including mixtures thereof, which should improve the properties of the material especially at room temperature.

However, neither of these references suggests additive materials or proportions thereof which would provide the properties necessary to produce satisfactory roller bearing cages which demand impact strength, bending strength, tensile strength, heat and age resistance and elastic deformability of a higher order than required for the friction bearings for which the materials of the prior art were intended.

As those skilled in the art are aware, the conditions of use of roller bearing cages require that they be composed of a material having substantial impact strength or toughness, tensile strength, elastic deformability and aging resistance, greater than those provided by the materials of the prior art. The molding materials of the prior art have included thermoplastic resins reinforced with carbon and glass fibers which have been known to improve the bending strength, tensile strength, heat resistance and term of use of friction and other bearings. However, there has been no suggestion in the prior art of how to improve the elastic deformability of these materials which is so necessary to their use in roller bearing cages. Indeed, it has been observed that the elastic deformability of the molded resins decreases with increasing content of fiber materials. For this reason, it has been found that elastically deformed parts of roller bearing cages made from such materials, such as retaining shoulders and the like, break off immediately or at best after only a short operating period causing the roller bearing to fail prematurely. This has been found to be especially the case with carbon fiber reinforced plastics in which other properties such as heat resistance and shape retention are improved as a result of the high fiber content.

Elastic deformability is an especially important characteristic in parts produced by injection molding since complex tools must be constructed to permit the application of known construction materials to produce molded parts having the structural strength and properties required of roller bearing cages or similar parts. Such tools must be removed first in the construction of multi-slides, for example, particularly from undercut recesses in injection molded parts, such as pockets in roller bearing cages with retaining shoulders, before removing the work piece from the mold, and this, of course, requires a high degree of elastic deformability to avoid breakage of the work piece.

Another problem of the prior art has been that the previously preferred known molding compositions used in the manufacture of roller bearing cages have had insufficient resistance to aging.

Still another problem has been that articles molded from the compositions of the prior art had too little impact toughness and were easily broken in use.

Moreover, conflicting requirements must often be met in selecting a molding composition for use in the manufacture of roller bearing cages, for example, thus making it necessary to compromise properties when using prior art compositions.

It is apparent, therefore, that a need has existed in the art for an improved thermoplastic molding composition possessing the combination of properties required to produce shaped parts, such as roller bearing cages, having in the molded and set article, the combination of impact strength, bending strength, tensile strength, heat resistance, aging resistance and elastic deformability required to ensure reliable performance and long operating life of the article in question.

It is, therefore, an object of the present invention to provide a thermoplastic molding composition which is inexpensive and readily processed to produce molded and shaped parts having improved impact strength, or toughness, which are deformable within predetermined limits, and which are also resistant to aging, even at relatively high operating temperatures and under adverse operating conditions under the effect of foreign substances and retain normal values or have improved values of bending strength, tensile strength, coefficient of heat expansion, wear factor, coefficient of friction, and heat conductivity.

It is a particular object of the invention to provide a thermoplastic molding material especially suitable for the production of roller bearing cages.

THE INVENTION

The foregoing and other objects of the invention which will become apparent below are achieved by providing a molding composition capable of being molded to form a structural shape which comprises from about 40 to about 60% thermoplastic resin as a matrix having uniformly dispersed therein, from about 5 to about 15%, and preferably about 5 to about 10% of carbon fiber, and from about 15 to about 25%, and preferably from about 15 to about 20% glass fiber.

While any suitable thermoplastic resin may be employed, the preferred thermoplastics are the polyamides.

The proportions of glass and carbon fibers in the thermoplastic matrix set forth above provide molding compositions which, when compared to those of the prior art, provide molded articles having improved impact strength or toughness, elastic deformability and aging resistance in particular, and also normal or improved levels of bending strength, tensile strength, wear factor, coefficient of friction and heat conductivity. The new molding compositions are easily processed by all conventional molding techniques, including injection molding.

The new compositions, on molding, provide articles having excellent elastic deformability, which is very important for roller bearing cages, especially those with retaining shoulders. This improvement is due to the proportions of the carbon and glass fibers and the thermoplastic resin matrix.

The invention will now be described in greater detail in conjunction with the following example.

EXAMPLE 1

A thermoplastic molding composition was formulated by blending in a conventional mixing apparatus the following materials:

|  | Parts by Weight Total Composition |
|---|---|
| (a) Thermoplastic molding resin | 60 |
| (b) Glass fiber | 25 |
| (c) Carbon fiber | 15 |
|  | 100 |

The above materials are blended until the fibers are uniformly dispersed in the thermoplastic resin.

This mixture is then introduced to a heated mold and molded at a temperature, time and pressure specified by the resin manufacturer. The mold is then allowed to cool until the work piece has set sufficiently to permit removal from the mold.

The completed work piece, in this case a roller bearing cage, is then tested for physical properties by standard test methods. The molded plastic will be found to have impact toughness, elastic deformability and aging resistance superior to articles made by the same method from molding compositions of the prior art. Moreover, the article will have normal or improved heat resistance, bending strength, tensile strength, wear factor, coefficient of friction, and heat conductivity.

The roller bearing cage will be easily removed from a complex mold without damage to its retaining shoulders and integral crosspieces and will not require the use of complex molding tools with slideable units.

The roller bearing cage is then assembled in a roller bearing and run at high speed. It will be found that the bearing will withstand higher speeds and operating temperatures than bearings of the prior art and will also remain functional for much longer periods of time.

Similar articles made by conventional injection molding processes will also be found to have the same superior properties.

The improvement in impact toughness of the articles produced from the new molding compositions permit the manufacture of roller bearing cages since the improved plastic is able to absorb the normal shocks and stresses encountered in use without damage to the roller bearing cage.

Moreover, inasmuch as the carbon and glass fibers are readily available and inexpensive, the new compositions are also inexpensive and simple to produce and process.

The new compositions are, of course, useful not only in making roller bearing cages, but in any application for which the molded article must have high impact strength, elastic deformability and age resistance.

The new compositions provide articles which resist aging far better than articles produced from known compositions even under relatively high operating temperatures and under adverse operating conditions under the effect of foreign substances and retain normal values or have improved values of bending strength, tensile strength, coefficient of heat expansion, wear factor, coefficient of friction, and heat conductivity.

What is claimed is:

1. A novel composition of matter capable of being molded to form a structural shape, and which comprises:
    (a) from about 40 to about 60% thermoplastic resin as a matrix, said matrix having uniformly distributed therein;
    (b) from about 5 to about 15% carbon fiber; and
    (c) from about 15 to about 25% glass fiber;
    all based on the total weight of said composition;
    said composition, after molding and setting, having: improved
    impact strength,
    elastic deformability, and
    aging resistance.

2. A composition of claim 1 containing about 5 to about 10% carbon fiber and about 15 to about 20% glass fiber.

3. A composition of claim 1 or 2 wherein the matrix is a polyamide.

4. A shaped article molded from a composition of claim 1.

5. An article of claim 4 in the form of a roller bearing cage.

* * * * *